Figures 1, 2:
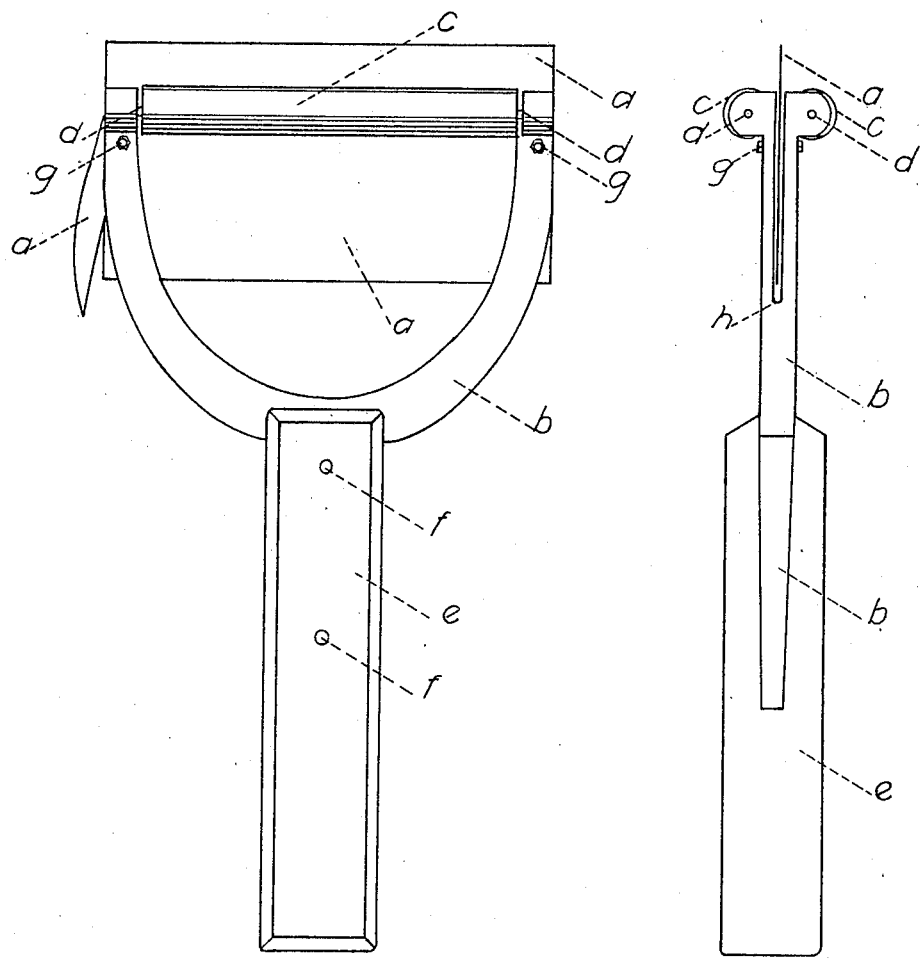

No. 837,203. PATENTED NOV. 27, 1906.
O. DUNKEL.
SKINNING KNIFE OR IMPLEMENT.
APPLICATION FILED MAY 21, 1906.

Witnesses.
JJA Williams
George R. Palmer

Inventor
Otto Dunkel
per Owsley Wilson
Attorney

UNITED STATES PATENT OFFICE.

OTTO DUNKEL, OF LINCOLN, NEBRASKA.

SKINNING KNIFE OR IMPLEMENT.

No. 837,203.  Specification of Letters Patent.  Patented Nov. 27, 1906.

Application filed May 21, 1906. Serial No. 318,100.

*To all whom it may concern:*

Be it known that I, OTTO DUNKEL, a citizen of the United States, residing in Lincoln, in the county of Lancaster and State of Nebraska, have invented a certain new and useful Skinning Knife or Implement, of which the following is a specification sufficiently clear to enable those skilled in the art to which it appertains to make and use the same.

My invention relates to a skinning knife or implement, and its object is the production of knife or implement for removing the skins of animals with great speed and ease without damaging the skins or the meat. This purpose is attained in my invention by certain novel construction and combination of parts, which will be hereinafter described and claimed.

The invention is illustrated in the accompanying drawings.

Figure 1 is a side elevation of my knife or implement. Fig. 2 is an end view or elevation of same.

Similar letters of reference indicate corresponding parts.

My device is composed of a blade or cutter $a$, which is in general form rectangular and made of tempered steel, the upper edge of which is sharpened, and on one side there is made a projection of similar shape and sharpeened like the straight-edged blade of a pocktknife. This projection may be made separately from the main part of the blade or cutter, if desired, It then can be fitted immovably to the handle. I perforate said blade on each side with a series of holes through which the bolt $g$ passes and by means of which the blade is adjusted for use or projected upward for convenience in grinding or sharpening.

I make the handle part $b$ of steel or other suitable metal and fit same into a handhold of wood or other suitable material $e$.

I make a slit in the handles, as shown at letter $h$, Fig. 2, in which the blade is inserted and secured by the bolts $g$ $g$ and by means of which the blade is adjusted with the cutting edge parallel to and the distance desired from the rollers. I make the two rollers C C of wood or other suitable material and adjust them between the ends of the handle-arms parallel to each other, on opposite sides of the blade, each revolving freely on its metal axis $d$, close to but not touching the blade.

In skinning an animal with my invention the operation is started by cutting the skin around each leg. This is done by quickly drawing the hooked or knife-blade shaped portion of the blade or cutter around the leg, the depth of the cut being regulated as desired by the bearing of the handle against the leg. The skin is slit by inserting the projecting point under the skin, then drawing the implement in the direction desired, the depth of the cut being regulated by the angle at which the handle is held. When the skin is sufficiently slit, it is pulled slightly to one side and the upper or long side of the blade is pushed down between the skin and the meat. The rollers on each side assist, pressing the skin on one side and the meat on the other side out of the way and permit the blade to quickly take the skin off without cutting either it or the meat. Thrusting strokes made in the direction of the line between the skin and the meat are recommended, the implement being operated with one hand while the loose skin is held taut with the other. When thus used, the rollers act as guards and prevent the cutting edge of the blade or cutter from coming in contact with either the skin or the meat at such an angle as to damage either. This permits rapid and effective work and also permits such work to safely be done in very poor light. It also enables those who otherwise could not do this kind of work on account of poor eyesight to work at it successfully with this implement. It also prevents great damage from cuts in the skins and hides.

Having thus described my invention, what I claim as new, and desire to secure by Letters Patent, is—

1. In a skinning-knife, a sharp blade or cutter of a general rectangular shape, one side however provided with a knife-blade or pruning-hook-shaped projection, the blade or cutter being secured in the two curved arms of the handle and held in position between the two rollers, by means of bolts, the ends of the two handle-arms fitted with two parallel rollers which revolve freely on metal axes.

2. In a skinning-knife, a sharp blade or cutter in combination with and fitting in slits in the two curved arms of a handle and secured thereto by bolts, the handle-arms provided with two rollers, parallel to each other, revolving freely on metal axes on either side of the blade, or cutter and between the ends of the handle-arms.

In testimony whereof I have signed my name to this specification in the presence of two subscribing witnesses.

OTTO DUNKEL.

Witnesses:
   EDWIN S. RIPLEY,
   HORACE G. WHITMORE.